US010010845B2

(12) United States Patent
Chyou et al.

(10) Patent No.: US 10,010,845 B2
(45) Date of Patent: *Jul. 3, 2018

(54) APPARATUS OF HYDROCARBON FUEL REACTORS HAVING CARBON DIOXIDE SEPARATED AND PURIFIED WITH SPACE EFFICIENCY

(71) Applicant: Institute of Nuclear Energy Research, Atomic Energy Council, Executive Yuan, R.O.C., Taoyuan (TW)

(72) Inventors: Yau-Pin Chyou, Taoyuan (TW); Po-Chuang Chen, Taoyuan (TW); Hsiu-Yun Chien, Taoyuan (TW); Keng-Tung Wu, Pingtung County (TW); Ching-Ying Huang, Taoyuan (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 21 days.

This patent is subject to a terminal disclaimer.

(21) Appl. No.: 15/335,592

(22) Filed: Oct. 27, 2016

(65) Prior Publication Data

US 2017/0341048 A1 Nov. 30, 2017

(30) Foreign Application Priority Data

May 26, 2016 (TW) .................................. 105116434

(51) Int. Cl.
*B01J 8/00* (2006.01)
*B01J 8/08* (2006.01)
*C01B 31/20* (2006.01)

(52) U.S. Cl.
CPC ............... *B01J 8/08* (2013.01); *B01J 8/087* (2013.01); *C01B 31/20* (2013.01); *B01J 2208/00256* (2013.01)

(58) Field of Classification Search
CPC ....... B01J 8/00; B01J 8/08; B01J 8/087; B01J 2208/00–2208/00017; B01J 2208/00106; B01J 2208/00168; B01J 2208/00256
See application file for complete search history.

(56) References Cited

U.S. PATENT DOCUMENTS

| 9,890,949 | B2 * | 2/2018 | Chyou | ................. | F23C 10/005 |
| 2014/0072917 | A1 * | 3/2014 | Fan | ......................... | C01B 3/22 |
| | | | | | 431/170 |
| 2017/0074507 | A1 * | 3/2017 | Chyou | ................. | F23C 10/005 |

* cited by examiner

*Primary Examiner* — Natasha E Young
(74) *Attorney, Agent, or Firm* — Jackson IPG PLLC; Demian K. Jackson

(57) ABSTRACT

An apparatus of hydrocarbon fuel reactors separates and purifies carbon dioxide ($CO_2$). Interconnected fluidized beds are applied in chemical-looping combustion. A multi-stage reduction reaction is processed with iron-based oxygen carriers. Three reduction stages using the iron-based oxygen carriers are accurately and completely controlled. Each of the three stages is separately processed in an individual space. Oxygen in the iron-based oxygen carriers can be fully released. High-purity $CO_2$ is obtained. Hydrogen can be produced as an option. Horizontal connection of three reduction reactors is changed into vertical one. An oxidation reactor is further connected. Thus, the whole structure occupies less area and effectively uses vertical space. Not only small space is effectively used; but also high-volume capacity is obtained. Each of the reactors has better geometry flexibility. The tandem reactor in each layer has less geometric influence and limitation. Therefore, each of the reactors can be resized on its own.

17 Claims, 5 Drawing Sheets

APPARATUS OF HYDROCARBON FUEL REACTORS HAVING CARBON DIOXIDE SEPARATED AND PURIFIED WITH SPACE EFFICIENCY

This application claims priority to Taiwanese Patent Application No. TW 105116434, filed on May 26, 2016, which is hereby expressly incorporated by reference in its entirety.

TECHNICAL FIELD OF THE INVENTION

The present invention relates to separating and purifying carbon dioxide ($CO_2$); more particularly, relates to changing horizontal connection of three reduction reactors into vertical connection for reducing the footprint of the overall structure with effectively-used vertical space, high-volume throughput, high operational efficiency and low cost.

DESCRIPTION OF THE RELATED ARTS

Many countries worldwide use a lot of fossil fuel for power generation, which also causes high $CO_2$ emission. On the other hand, development of renewable energy sources is slow, and fossil fuel is still predominant. Hence, on facing the environmental problem of global warming caused by $CO_2$, an important method currently known for significantly reducing the $CO_2$ emission is carbon capture, storage and utilization (CCSU).

According to thermoelectric fuel conversion modes, the current technologies for $CO_2$ capture can be divided into post-combustion capture, pre-combustion capture and oxy-combustion capture. Therein, chemical-looping combustion belongs to oxy-fuel combustion. Chemical-looping combustion uses an oxygen carrier as a medium to transfer oxygen in the air into a metal oxide in a fuel reactor and, then, a fuel is processed through combustion with the transferred oxygen in the metal oxide and high-purity $CO_2$ is produced. Hence, chemical-looping combustion features low-pollution discharge with high efficiency of power generation during $CO_2$ capture, which has been recognized worldwide as an option with great potential for developing $CO_2$ capture technology.

At present, oxygen carriers can be oxides of a metal like nickel (Ni), iron (Fe), copper (Cu) and manganese (Mn). Therein, the structure of iron-based oxygen carrier is mainly of ferric oxide ($Fe_2O_3$), which processes three stages of reduction reaction in a combustion reactor:

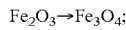
$Fe_2O_3 \rightarrow Fe_3O_4$;

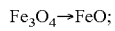
$Fe_3O_4 \rightarrow FeO$;

$FeO \rightarrow Fe$.

The most common chemical-looping reactors include two categories: fluidized-bed reactors (FBR) and moving-bed reactors (MBR). Conventional FBR has a big size and can not effectively control the three-stage reduction reaction on reducing $Fe_2O_3$ to Fe, wherein it is uncertain which stage is processed at a certain time. For a fully completed reaction, the conventional combustion takes a long time with low efficiency. Besides, because oxygen in the oxygen carrier is not completely released during the reaction, the throughput is limited and the fuel may not be reacted completely.

Conclusively, there are still many problems to be improved regarding the materials of the oxygen carriers, the designs of the reactors, the related applications, etc. Hence, the prior arts do not fulfill all users' requests for actual implementation.

SUMMARY OF THE INVENTION

Interconnected fluidized bed (IFB) is applied in chemical-looping combustion for a multi-stage reduction reaction using iron-based oxygen carriers, where three stages of the reduction reaction using iron-based oxygen carriers are accurately and completely controlled to separately process each stage in an individual space for fully releasing oxygen in the iron-based oxygen carriers.

The main purpose of the present invention is to change horizontal connection of three reduction reactors into vertical connection for separating and purifying $CO_2$ with vertical space effectively used, where footprint of the overall structure is reduced; each reduction reactor gains more geometry flexibility; through layering, the tandem reduction reactor in each layer have less geometrical influence and limit; and the reduction reactor in each layer can be resized on their own.

Another purpose of the present invention is to obtain high-purity $CO_2$ even accompanied with hydrogen production, where high-volume throughput, high operational efficiency and low cost are obtained.

Another purpose of the present invention is to set a heat exchanger between various adjacent reduction reactors in the vertically-connecting structure for improving overall performance.

To achieve the above purposes, the present invention is an apparatus of hydrocarbon fuel reactors having $CO_2$ separated and purified with space efficiency, comprising a first reduction reactor, a second reduction reactor, a third reduction reactor and an oxidation reactor, where the first reduction reactor comprises a first lean bed and a first dense bed, a first orifice located at a side of bottom of the first dense bed, and a first weir located at a side of top of the first lean bed; $Fe_2O_3$ is added to the first lean bed and used as an iron-based oxygen carrier; the first stage reduction reaction is processed to obtain a gas comprising $CO_2$ and steam while reduce $Fe_2O_3$ to ferroferric oxide ($Fe_3O_4$); and $Fe_3O_4$ rises up in the first lean bed and crosses over the first weir; the second reduction reactor is located below and connected to the first reduction reactor; the second reduction reactor comprises a second lean bed and a second dense bed, a second orifice located at a side of bottom of the second dense bed and a second weir located at a side of top of the second lean bed; $Fe_3O_4$ enters the second dense bed through the first weir and settles down in the second dense bed; $CO_2$ is passed into the second dense bed and used as a carrier gas to deliver $Fe_3O_4$ from the second dense bed into the second lean bed through the second orifice; the second stage reduction reaction is processed with a hydrocarbon fuel to obtain a gas comprising $CO_2$ and steam while reduce $Fe_3O_4$ to iron oxide (FeO); FeO rises up in the second lean bed and crosses over the second weir; the third reduction reactor is located below and connected to the second reduction reactor; the third reduction reactor comprises a third dense bed and a third lean bed, a third orifice located at a side of bottom of the third dense bed, and a third weir located at a side of top of the third lean bed; FeO enters the third dense bed through the second weir and settles down in the third dense bed; $CO_2$ is passed into the third dense bed and used as a carrier gas to deliver FeO from the third dense bed into the third lean bed through the third orifice; the third stage reduction reaction is processed with a hydrocarbon fuel to obtain a gas comprising $CO_2$ and steam while reduce FeO to iron (Fe); and Fe rises up in the third lean bed and crosses over the third weir; the oxidation reactor is located at a side of the first reduction reactor, the second reduction reactor and the third reduction reactor and connected to the first reduction reactor and the third reduction reactor; the oxidation reactor comprises a fourth dense bed and a fourth lean bed, a fourth orifice located at a side of bottom of the fourth dense bed, and a fourth weir located at a side of top of the fourth lean bed; Fe enters the fourth dense bed through the third weir and settles down in the fourth dense bed; $CO_2$ is passed into the fourth dense bed and used as a carrier gas to deliver Fe from the fourth dense bed into the fourth lean bed through the fourth orifice; an oxidation reaction is processed with air to obtain a gas comprising nitrogen and oxygen and turn Fe to $Fe_2O_3$; $Fe_2O_3$ rises up in the fourth lean bed and crosses over the fourth weir; $Fe_2O_3$ enters the first dense bed and settles down in the first dense bed; $CO_2$ is passed into the first dense bed and used as a carrier gas to deliver $Fe_2O_3$ from the first dense bed into the first lean bed through the first orifice to form a loop; and, thus, the loop is processed by providing the iron-based oxygen carrier into the first reduction reactor. Accordingly, a novel apparatus of hydrocarbon fuel reactors having $CO_2$ separated and purified with space efficiency is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
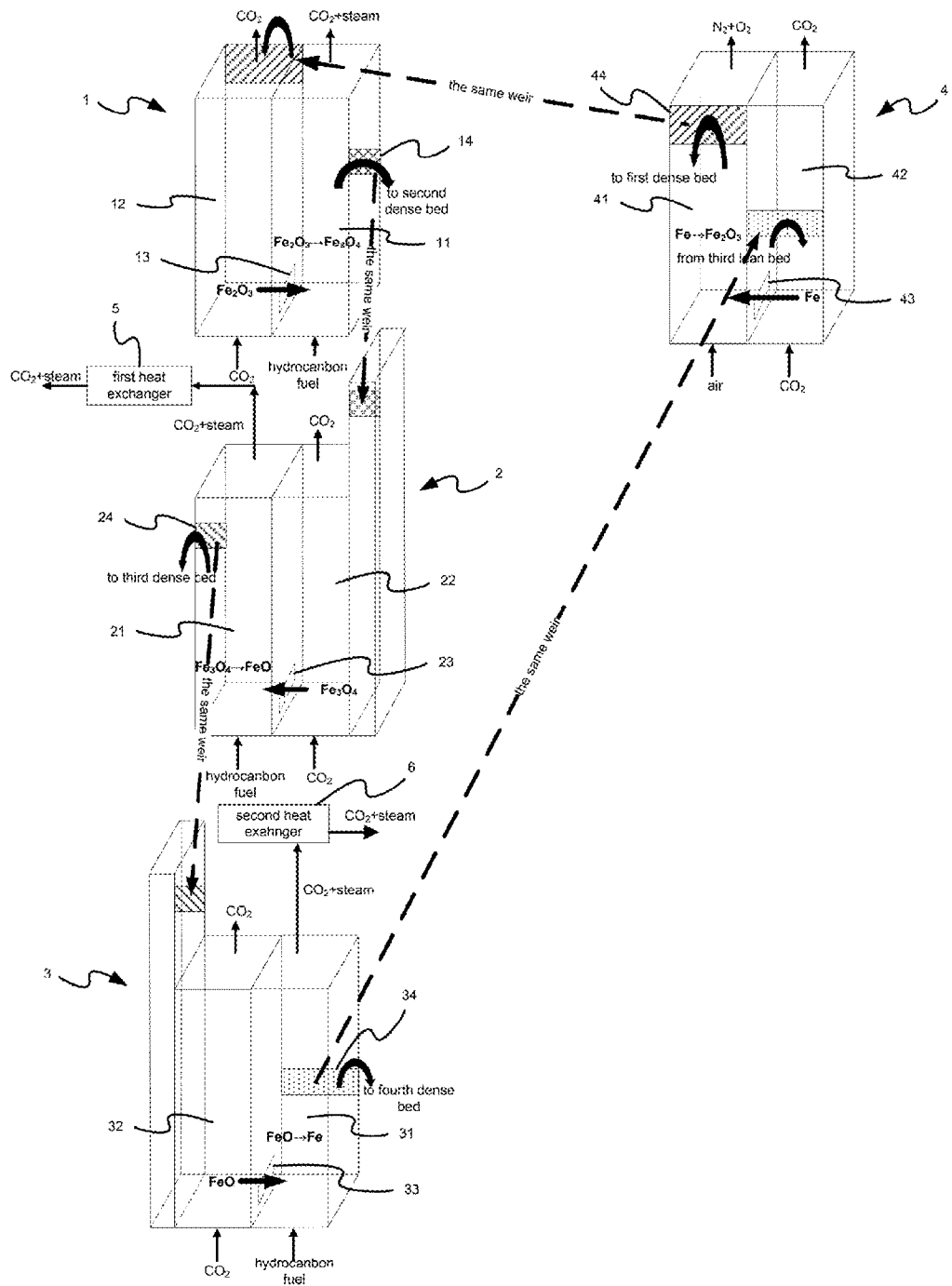
FIG. 1 is the explosive view showing the preferred embodiment according to the present invention.

The following description of the preferred embodiment is provided to understand the features and the structures of the present invention.

Please refer to FIG. 1~FIG. 5, which are an explosive view showing a preferred embodiment according to the present invention; front, side and top views showing the preferred embodiment; and a view showing heat recovery. As shown in the figures, the present invention is an apparatus of hydrocarbon fuel reactors having carbon dioxide ($CO_2$) separated and purified with space efficiency, comprising a first reduction reactor 1, a second reduction reactor 2, a third reduction reactor 3, an oxidation reactor 4, a first heat exchanger 5 and a second heat exchanger 6.

The first reduction reactor 1 is communicated with the second reduction reactor 2 and the oxidation reactor 4; and comprises a first lean bed 11 and a first dense bed 12. Therein, a first orifice 13 is set at a side of bottom of the first dense bed 12; and a first weir 14 is set at a side of top of the first lean bed 11.

The second reduction reactor 2 is located below and communicated with the first reduction reactor 1; and comprises a second lean bed 21 and a second dense bed 22. Therein, a second orifice 23 is set at a side of bottom of the second dense bed 22; and a second weir 24 is set at a side of top of the second lean bed 21.

The third reduction reactor 3 is located below and communicated with the second reduction reactor 2; and comprises a third lean bed 31 and a third dense bed 32. Therein, a third orifice 33 is set at a side of bottom of the third dense bed 32; and a third weir 34 is set at a side of top of the third lean bed 31 to be connected with the oxidation reactor 4.

The oxidation reactor 4 is set at a side of the first reduction reactor 1, the second reduction reactor 2 and the third reduction reactor 3 and is communicated with the first reduction reactor 1 and the third reduction reactor 3; and comprises a fourth lean bed 41 and a fourth dense bed 42. Therein, a fourth orifice 43 is set at a side of bottom of the fourth dense bed 42; and a fourth weir 44 is set at a side of top of the fourth lean bed 41 to be connected with the first reduction reactor 1.

The first heat exchanger 5 is set between the first reduction reactor 1 and the second reduction reactor 2; and the second heat exchanger 6 is set between the second reduction reactor 2 and the third reduction reaction 3.

Thus, a novel apparatus of hydrocarbon fuel reactors having $CO_2$ separated and purified with space efficiency is obtained.

The first, the second and the third reduction reactors 1,2,3 are vertically connected and stacked, where the first, the second and the third lean bed 11,21,31 are dislocated with the first, the second and the third dense bed 12,22,32; and the first, the second and the third reduction reactors 1,2,3 have different geometric sizes according to kinetic differences of reduction reactions processed within.

Figure 2:
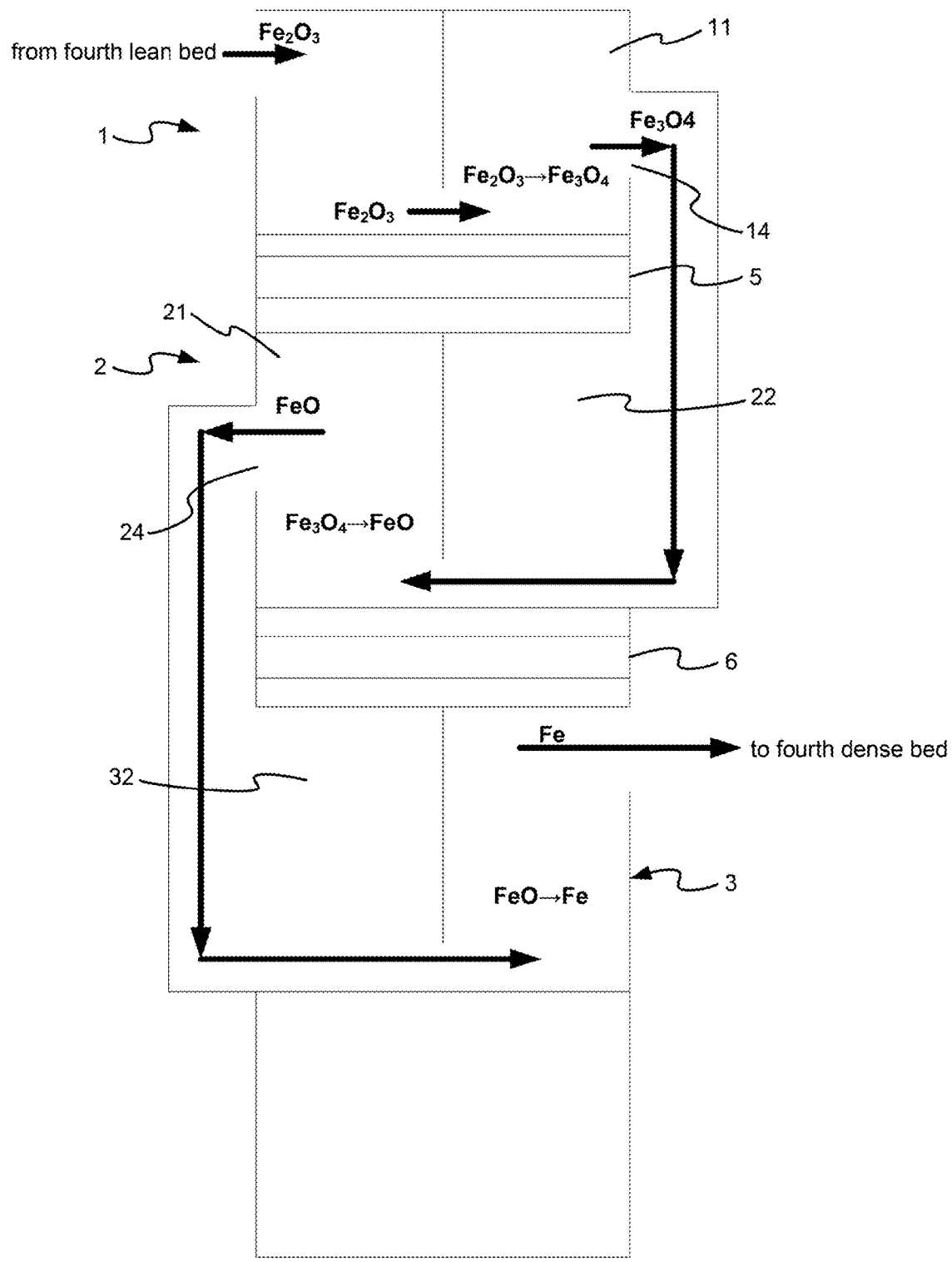
FIG. 2 is the front view showing the preferred embodiment.
Figure 3:
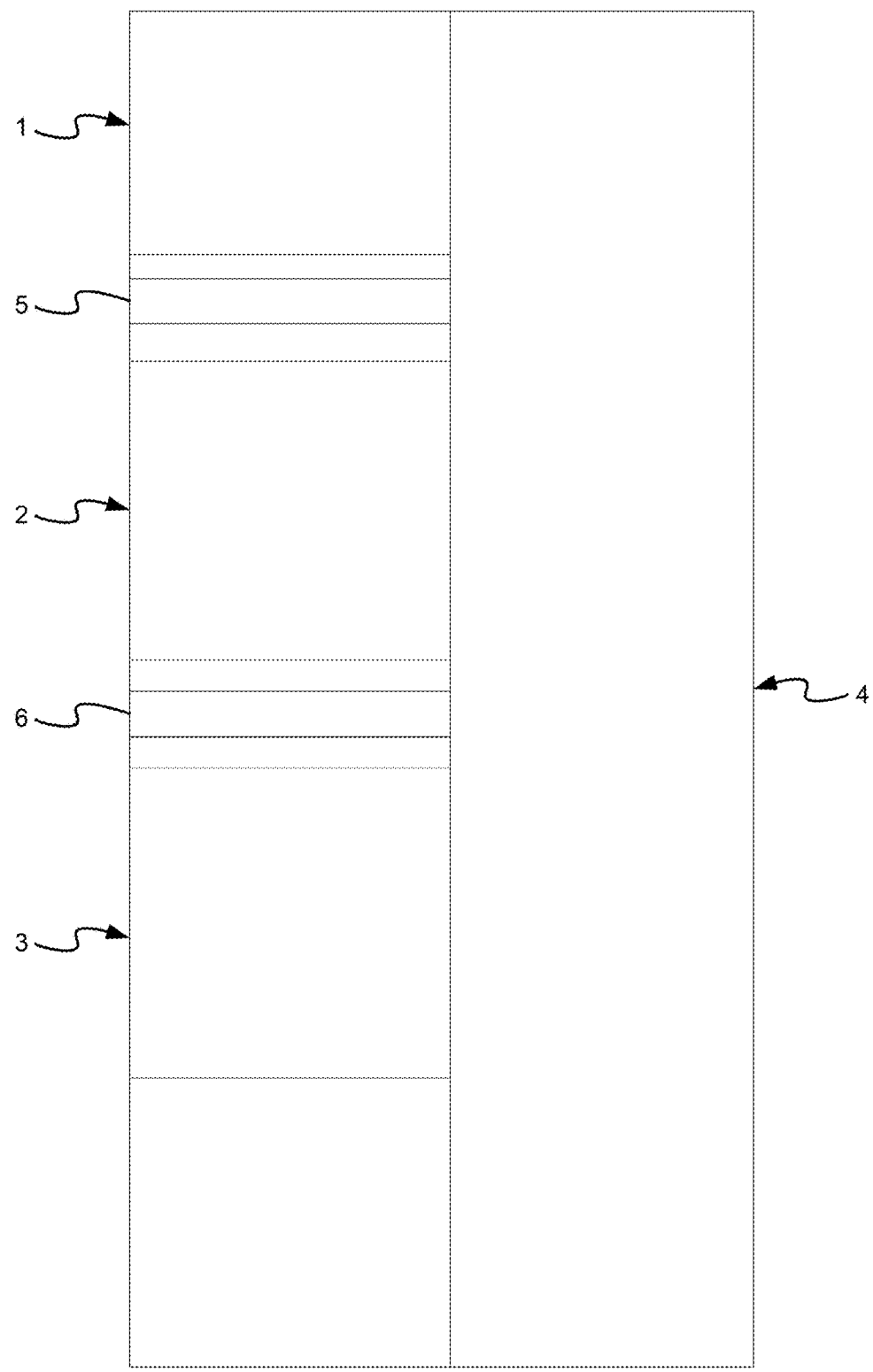
FIG. 3 is the side view showing the preferred embodiment.
Figure 4:
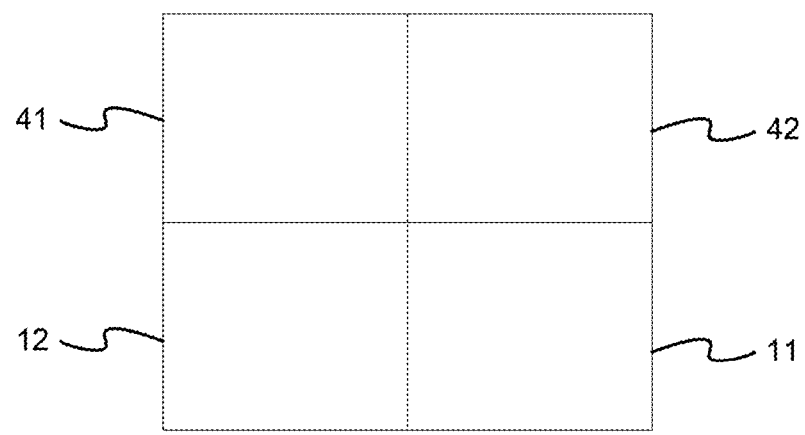
FIG. 4 is the top view showing the preferred embodiment.

After crossing the first weir 14, ferroferric oxide ($Fe_3O_4$) in the first lean bed 11 enters into the second dense bed 22 through a channel at bottom or a side, where the preferred embodiment uses a channel at a side as shown in FIG. 1 and FIG. 2.

After iron oxide (FeO) in the second lean bed 21 crosses the second weir 24, FeO enters into the third dense bed 32 through a channel at bottom or a side, where the preferred embodiment uses a channel at a side as shown in FIG. 1 and FIG. 2.

On using the present invention, the fluid-like particles used are of an iron-based oxygen carrier, i.e. ferric oxide ($Fe_2O_3$), to be added into the first lean bed 11 of the first reduction reactor 1. Then, a hydrocarbon fuel is introduced to process a first stage of a reduction reaction for producing a metal oxide ($Fe_3O_4$) and a gas with heat exchange. The heat exchange is depending on the fuel inputted, where there is heat absorbed and released accordingly. For example, an exothermic reaction occurs with a synthetic gas as a fuel; while, an endothermic reaction occurs with methane as a fuel. The exothermic reaction using the synthesis gas as the fuel releases heat to generate steam for what is required in procedure or to spin a steam turbine for driving a generator for electricity generation. The gas, which contains $CO_2$ and steam, is discharged from the first reduction reactor 1. The reduced metal oxide ($Fe_3O_4$) rises up in the first lean bed 11 and, then, crosses the first weir 14 to enter the second dense bed 22 of the second reduction reactor 2 and settles down.

Figure 5:
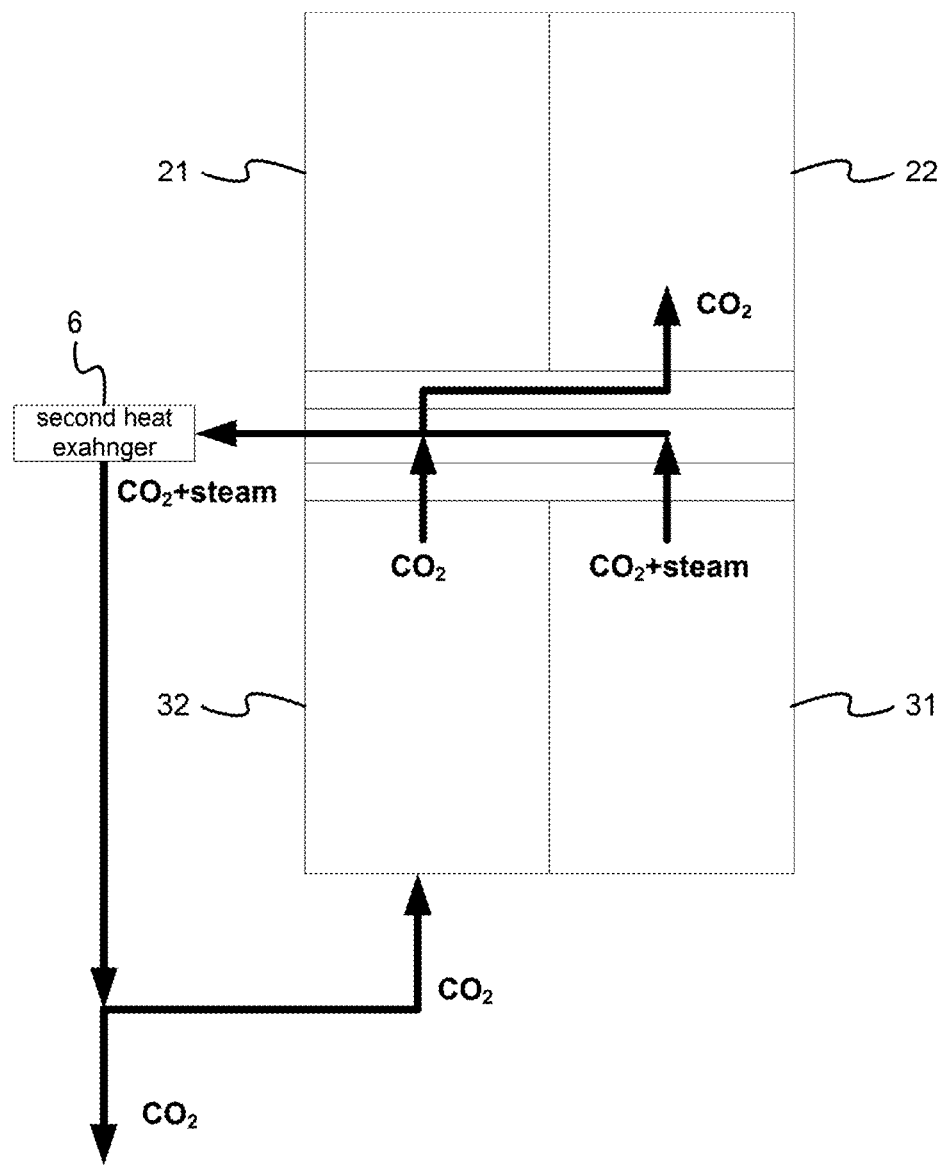
FIG. 5 is the view showing the heat recovery.

A carrier gas (such as $CO_2$, which can be a gas discharged from the third reduction reactor 3 as shown in FIG. 5) is passed into the second dense bed 22 to deliver $Fe_3O_4$ from the second dense bed 22 to enter into the second lean bed 21 through the second orifice 23. A hydrocarbon fuel is passed into the second lean bed 21 to process a second stage of the reduction reaction with $Fe_3O_4$. A metal oxide (FeO) and a gas are produced. The gas, comprising $CO_2$ and steam, is discharged from the second reduction reactor 2. The reduced metal oxide (FeO) rises up in the second lean bed 21; and, then, crosses over the second weir 24 to enter into the third dense bed 32 and settles down. Therein, the discharged gas of $CO_2$ and steam enters into the first heat exchanger 5 for heating up $CO_2$ or the hydrocarbon fuel as required. A part of heated $CO_2$ is supplied back to the first and the second reduction reactor 1,2 as the delivering gas for the first and second dense bed 12,22 with flow amount adjusted. Or, the hydrocarbon fuel is heated and delivered to the first reduction reactor 1 as a reducing gas for the first lean bed 11.

A delivering gas (such as $CO_2$) is passed into the third dense bed 32 to deliver FeO in the third dense bed 32 into the third lean bed 31 through the third orifice 33. A hydrocarbon fuel is passed into the third lean bed 31 to process a third stage of the reduction reaction to produce a metal (Fe) and a gas with heat exchange. Difference between heat absorption and dissipation is depending on different fuel inputted before energy exchange. For example, an exothermic reaction occurs on using a syngas as the fuel; yet, an endothermic reaction occurs on using methane as the fuel. The exothermic reaction using the fuel of the syngas releases heat with steam generated for what is required in procedure or for electricity generation by driving a generator through spinning a steam turbine. The gas, comprising $CO_2$ and steam, is discharged from the third reduction reactor 3. The product of the reduced metal iron (Fe) rises up in the third lean bed 31 and crosses over the third weir 34 to enter into the dense bed 42 and be settled down. Therein, the discharged gas of $CO_2$ and steam enters into the second heat exchanger 6 for heating up $CO_2$ or the hydrocarbon fuel. A part of the heated $CO_2$ is supplied back to the second and the third reduction reactors 2,3 to be used as a delivering gas in the second and the third dense bed 22, 32 with the flow amount adjusted. Or, the heated hydrocarbon fuel is delivered to the second reduction reactor 2 to be used as a reducing gas for the second lean bed 21.

A delivering gas (such as $CO_2$) is passed into the fourth dense bed 42 to deliver Fe from the fourth dense bed 42 to enter into the fourth lean bed 41 through the fourth orifice 43. Air is passed into the fourth lean bed for processing an oxidation reaction with Fe to generate a gas consisting of nitrogen ($N_2$) and oxygen ($O_2$) and convert Fe back to $Fe_2O_3$. Therein, the gas consisting of $N_2$ and $O_2$ is discharged out of the oxidation reactor 4. $Fe_2O_3$ rises up in the fourth lean bed 41 and crosses the fourth weir 44 to enter into the first dense bed 12 and settles down. $CO_2$ (which can be the gas discharged from the second reduction reactor 2) is passed into the first dense bed 12 to be used as a delivering gas to deliver $Fe_2O_3$ from the first dense bed 12 to enter into the first lean bed 11 through the first orifice 13. Thus, a loop is formed, where the iron-based oxygen carrier is provided to the first reduction reactor 1 again.

The first, the second and the third stages of the reduction reaction are processed at a temperature of 400~950° C.

In another state-of-use, the metal iron (Fe) entered into the fourth lean bed 41 of the oxidation reactor 4 through the fourth orifice 43 can be used to process the oxidation reaction with another gas (e.g. steam) only if the gas provides oxygen atoms. A gas of hydrogen ($H_2$) is generated with $Fe_2O_3$ formed. Therein, the gas of $H_2$ is discharged out of the oxidation reactor 4; $Fe_2O_3$ rises up in the fourth lean bed 41 and crosses over the fourth weir 44 to enter into the first dense bed 12 and settles down. Steam is passed into the first dense bed 12 as a delivering gas to deliver $Fe_2O_3$ from the first dense bed 12 to the first lean bed 11 through the first orifice 13. Thus, a loop is formed, where the iron-based oxygen carrier is provided to the first reduction reactor 1 again.

The present invention applies interconnected fluidized bed (IFB) in chemical-looping combustion for a multi-stage reduction reaction using iron-based oxygen carriers. Three stages of the reduction reaction using iron-based oxygen carriers are accurately and completely controlled to separately process each stage in an individual space for fully releasing oxygen in the iron-based oxygen carriers and obtaining high-purity $CO_2$, even accompanied with hydrogen production. Furthermore, horizontal connection of three reduction reactors is changed into vertical layout (six planar cells into two planar cells) and connected with an oxidation reactor that occupies another two planar cells; hence, the footprint of the overall structure is reduced from eight planar cells to four planar cells for effectively using vertical space. Not only small space can be effectively used; but also high-volume capacity is obtained. Nevertheless, each reduction reactor gains more geometry flexibility (since each reduction reaction is quite different and requires adjustment of residence time in the reduction reactor through its geometric design). Through layering, the reduction reactor having tandem connection in each layer has less geometrical influence and limit. In other words, the reduction reactor in each layer can be resized on their own owing to the vertical connection, where reactants reach the next reduction reactor by going down after crossing a weir. Hence, the present invention features a small footprint, a high-volume throughput, high operational efficiency and low cost.

To sum up, the present invention is an apparatus of hydrocarbon fuel reactors having $CO_2$ separated and purified with space efficiency, where horizontal connection of three reduction reactors is changed into vertical connection with an oxidation reactor further connected for reducing footprint of the overall structure from eight planar cells to four planar cells with vertical space effectively used; not only small space can be effectively used, but also high-volume capacity is obtained; each of the reduction reactors gains more geometry flexibility; through layering, the reduction reactor having tandem connection in each layer has less geometrical influence and limit, to be resized on their own due to the vertical connection of a space after crossing a weir; and, hence, the present invention exhibits features of a small footprint, a high-volume throughput, high operational efficiency and low cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:
1. An apparatus of hydrocarbon fuel reactors having carbon dioxide ($CO_2$) separated and purified, comprising:
  a first reduction reactor,
    wherein the said first reduction reactor comprises a first lean bed and a first dense bed, a first orifice located at a side of bottom of said first dense bed, and a first weir located at a side of top of said first lean bed; and
  wherein ferric oxide ($Fe_2O_3$) is added to the said first lean bed and used as an iron-based oxygen carrier; a first stage of a reduction reaction is processed to obtain a gas comprising $CO_2$ and steam and reduce $Fe_2O_3$ to ferroferric oxide ($Fe_3O_4$); and $Fe_3O_4$ rises up in said first lean bed and crosses over said first weir;

a second reduction reactor,
wherein the said second reduction reactor is located below and connected to the said first reduction reactor; while comprises a second lean bed and a second dense bed, a second orifice located at a side of bottom of said second dense bed, and a second weir located at a side of top of said second lean bed; and
wherein $Fe_3O_4$ enters the said second dense bed through said first weir and settles down in said second dense bed; $CO_2$ is passed into said second dense bed and used as a carrier gas to deliver $Fe_3O_4$ from said second dense bed into said second lean bed through said second orifice; a second stage of said reduction reaction is processed with a hydrocarbon fuel to obtain a gas comprising $CO_2$ and steam and reduce $Fe_3O_4$ to iron oxide (FeO); and FeO rises up in said second lean bed and crosses over said second weir;
a third reduction reactor,
wherein the said third reduction reactor is located below and connected to the said second reduction reactor; while comprises a third dense bed and a third lean bed, a third orifice located at a side of bottom of said third dense bed, and a third weir located at a side of top of said third lean bed; and
wherein FeO enters the said third dense bed through said second weir and settles down in said third dense bed; $CO_2$ is passed into said third dense bed and used as a carrier gas to deliver FeO from said third dense bed into said third lean bed through said third orifice; a third stage of said reduction reaction is processed with a hydrocarbon fuel to obtain a gas comprising $CO_2$ and steam and reduce FeO to iron (Fe); and Fe rises up in said third lean bed and crosses over said third weir; and
an oxidation reactor,
wherein the said oxidation reactor is located at a side of the said first reduction reactor, said second reduction reactor and said third reduction reactor and connected to the said first reduction reactor and said third reduction reactor; while comprises a fourth dense bed and a fourth lean bed, a fourth orifice located at a side of bottom of said fourth dense bed, and a fourth weir located at a side of top of said fourth lean bed;
wherein Fe enters the said fourth dense bed through said third weir and settles down in said fourth dense bed; $CO_2$ is passed into said fourth dense bed and used as a carrier gas to deliver Fe from said fourth dense bed into said fourth lean bed through said fourth orifice; an oxidation reaction is processed with air to obtain a gas comprising nitrogen and oxygen and turn Fe to $Fe_2O_3$; $Fe_2O_3$ rises up in said fourth lean bed to cross over said fourth weir; $Fe_2O_3$ enters and settles down in said first dense bed; $CO_2$ is passed into said first dense bed and used as a carrier gas to deliver $Fe_2O_3$ from said first dense bed into said first lean bed through said first orifice to form a loop; and, thus, said loop is processed by providing said iron-based oxygen carrier into said first reduction reactor; and
at least one heat exchanger to heat up a working medium by said gas consisting of $CO_2$ and steam; and said working medium is selected from a group of $CO_2$ and a hydrocarbon fuel.

2. The apparatus according to claim 1,
wherein said first, said second and said third stages of said reduction reaction are processed at a temperature of 400~950 celsius degrees (° C.).

3. The apparatus according to claim 1,
wherein said first, said second and said third lean beds are staggered and dislocated with said first, said second and said third dense beds.

4. The apparatus according to claim 1,
wherein the said first, said second and said third reduction reactors have different geometric dimensions according to the differences of reducing reaction kinetics processed in said first, said second and said third reduction reactors.

5. The apparatus according to claim 1,
wherein the said first, said second and said third reduction reactors are vertically connected and stacked.

6. The apparatus according to claim 1,
wherein the said fourth lean bed utilizes steam to process said oxidation reaction with Fe; then hydrogen ($H_2$) is obtained; and Fe is turned into $Fe_2O_3$.

7. The apparatus according to claim 1,
wherein, after crossing said first weir, $Fe_3O_4$ in said first lean bed enters said second dense bed through a channel located at bottom or a side.

8. The apparatus according to claim 1,
wherein, after crossing said second weir, FeO in said second lean bed enters said third dense bed through a channel located at bottom or a side.

9. The apparatus according to claim 1,
wherein said working medium to be heated is $CO_2$; is supplied to said first, said second and said third reduction reactors; and is used as a carrier gas in said first, said second and said third dense bed.

10. The apparatus according to claim 1,
wherein said working medium to be heated is $CO_2$; is supplied to said oxidation reactor; and is used as a carrier gas in said fourth dense bed.

11. The apparatus according to claim 1,
wherein said working medium to be heated is said hydrocarbon fuel; is supplied to a reduction reactor selected from a group of said first reduction reactor and said second reduction reactor; and is used as a reduction gas in a corresponding lean bed selected from a group of said first lean bed and said second lean bed.

12. The apparatus according to claim 1,
wherein said working medium to be heated is said hydrocarbon fuel; is supplied to said first and said second reduction reactors; and is used as a reduction gas in said first and said second lean beds.

13. The apparatus according to claim 1,
wherein said heat exchanger is located between said first reduction reactor and said second reduction reaction.

14. The apparatus according to claim 1,
wherein said heat exchanger is located between said second reduction reactor and said third reduction reactor.

15. The apparatus according to claim 1,
wherein said heat exchanger is located between said first reduction reactor and said second reduction reaction and between said second reduction reactor and said third reduction reactor.

16. An apparatus of hydrocarbon fuel reactors having carbon dioxide ($CO_2$) separated and purified, comprising:
a first reduction reactor,
wherein the said first reduction reactor comprises a first lean bed and a first dense bed, a first orifice located at a side of bottom of said first dense bed, and a first weir located at a side of top of said first lean bed; and
wherein ferric oxide ($Fe_2O_3$) is added to the said first lean bed and used as an iron-based oxygen carrier; a first stage of a reduction reaction is processed to obtain a gas comprising $CO_2$ and steam and reduce $Fe_2O_3$ to ferroferric oxide ($Fe_3O_4$); and $Fe_3O_4$ rises up in said first lean bed and crosses over said first weir;

a second reduction reactor,
      wherein the said second reduction reactor is located below and connected to the said first reduction reactor; while comprises a second lean bed and a second dense bed, a second orifice located at a side of bottom of said second dense bed, and a second weir located at a side of top of said second lean bed; and
      wherein $Fe_3O_4$ enters the said second dense bed through said first weir and settles down in said second dense bed; $CO_2$ is passed into said second dense bed and used as a carrier gas to deliver $Fe_3O_4$ from said second dense bed into said second lean bed through said second orifice; a second stage of said reduction reaction is processed with a hydrocarbon fuel to obtain a gas comprising $CO_2$ and steam and reduce $Fe_3O_4$ to iron oxide (FeO); and FeO rises up in said second lean bed and crosses over said second weir;
   a third reduction reactor,
wherein the said third reduction reactor is located below and connected to the said second reduction reactor; while comprises a third dense bed and a third lean bed, a third orifice located at a side of bottom of said third dense bed, and a third weir located at a side of top of said third lean bed; and
      wherein FeO enters the said third dense bed through said second weir and settles down in said third dense bed; $CO_2$ is passed into said third dense bed and used as a carrier gas to deliver FeO from said third dense bed into said third lean bed through said third orifice; a third stage of said reduction reaction is processed with a hydrocarbon fuel to obtain a gas comprising $CO_2$ and steam and reduce FeO to iron (Fe); and Fe rises up in said third lean bed and crosses over said third weir; and
   an oxidation reactor,
wherein the said oxidation reactor is located at a side of the said first reduction reactor, said second reduction reactor and said third reduction reactor and connected to the said first reduction reactor and said third reduction reactor; while comprises a fourth dense bed and a fourth lean bed, a fourth orifice located at a side of bottom of said fourth dense bed, and a fourth weir located at a side of top of said fourth lean bed; and
      wherein Fe enters the said fourth dense bed through said third weir and settles down in said fourth dense bed; $CO_2$ is passed into said fourth dense bed and used as a carrier gas to deliver Fe from said fourth dense bed into said fourth lean bed through said fourth orifice; an oxidation reaction is processed with air to obtain a gas comprising nitrogen and oxygen and turn Fe to $Fe_2O_3$; $Fe_2O_3$ rises up in said fourth lean bed to cross over said fourth weir; $Fe_2O_3$ enters and settles down in said first dense bed; $CO_2$ is passed into said first dense bed and used as a carrier gas to deliver $Fe_2O_3$ from said first dense bed into said first lean bed through said first orifice to form a loop; and, thus, said loop is processed by providing said iron-based oxygen carrier into said first reduction reactor,
   wherein said first, said second and said third lean beds are staggered and dislocated with said first, said second and said third dense beds.

17. An apparatus of hydrocarbon fuel reactors having carbon dioxide ($CO_2$) separated and purified, comprising:

a first reduction reactor,
      wherein the said first reduction reactor comprises a first lean bed and a first dense bed, a first orifice located at a side of bottom of said first dense bed, and a first weir located at a side of top of said first lean bed; and
   wherein ferric oxide ($Fe_2O_3$) is added to the said first lean bed and used as an iron-based oxygen carrier; a first stage of a reduction reaction is processed to obtain a gas comprising $CO_2$ and steam and reduce $Fe_2O_3$ to ferroferric oxide ($Fe_3O_4$); and $Fe_3O_4$ rises up in said first lean bed and crosses over said first weir;
   a second reduction reactor,
      wherein the said second reduction reactor is located below and connected to the said first reduction reactor; while comprises a second lean bed and a second dense bed, a second orifice located at a side of bottom of said second dense bed, and a second weir located at a side of top of said second lean bed; and
      wherein $Fe_3O_4$ enters the said second dense bed through said first weir and settles down in said second dense bed; $CO_2$ is passed into said second dense bed and used as a carrier gas to deliver $Fe_3O_4$ from said second dense bed into said second lean bed through said second orifice; a second stage of said reduction reaction is processed with a hydrocarbon fuel to obtain a gas comprising $CO_2$ and steam and reduce $Fe_3O_4$ to iron oxide (FeO); and FeO rises up in said second lean bed and crosses over said second weir;
   a third reduction reactor,
wherein the said third reduction reactor is located below and connected to the said second reduction reactor; while comprises a third dense bed and a third lean bed, a third orifice located at a side of bottom of said third dense bed, and a third weir located at a side of top of said third lean bed; and
      wherein FeO enters the said third dense bed through said second weir and settles down in said third dense bed; $CO_2$ is passed into said third dense bed and used as a carrier gas to deliver FeO from said third dense bed into said third lean bed through said third orifice; a third stage of said reduction reaction is processed with a hydrocarbon fuel to obtain a gas comprising $CO_2$ and steam and reduce FeO to iron (Fe); and Fe rises up in said third lean bed and crosses over said third weir; and
   an oxidation reactor,
wherein the said oxidation reactor is located at a side of the said first reduction reactor, said second reduction reactor and said third reduction reactor and connected to the said first reduction reactor and said third reduction reactor; while comprises a fourth dense bed and a fourth lean bed, a fourth orifice located at a side of bottom of said fourth dense bed, and a fourth weir located at a side of top of said fourth lean bed; and
      wherein Fe enters the said fourth dense bed through said third weir and settles down in said fourth dense bed; $CO_2$ is passed into said fourth dense bed and used as a carrier gas to deliver Fe from said fourth dense bed into said fourth lean bed through said fourth orifice; an oxidation reaction is processed with air to obtain a gas comprising nitrogen and oxygen and turn Fe to $Fe_2O_3$; $Fe_2O_3$ rises up in said fourth lean bed to cross over said fourth weir; $Fe_2O_3$ enters and settles down in said first dense bed; $CO_2$ is passed into said first dense bed and used as a carrier gas to deliver $Fe_2O_3$ from said first dense bed into said first lean bed through said first orifice to form a loop; and, thus, said loop is processed by providing said iron-based oxygen carrier into said first reduction reactor, wherein the said first, said second and said third reduction reactors have different geometric dimensions according to the differences of reducing reaction kinetics processed in said first, said second and said third reduction reactors.

* * * * *